United States Patent
Kinoshita

(10) Patent No.: US 10,066,749 B2
(45) Date of Patent: Sep. 4, 2018

(54) SHIFT CONTROL DEVICE

(71) Applicant: FUJI JUKOGYO KABUSHIKI KAISHA, Tokyo (JP)

(72) Inventor: Takahiro Kinoshita, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 326 days.

(21) Appl. No.: 14/913,355

(22) PCT Filed: Jul. 16, 2014

(86) PCT No.: PCT/JP2014/068865
§ 371 (c)(1),
(2) Date: Feb. 20, 2016

(87) PCT Pub. No.: WO2015/025644
PCT Pub. Date: Feb. 26, 2015

(65) Prior Publication Data
US 2016/0215880 A1 Jul. 28, 2016

(30) Foreign Application Priority Data
Aug. 20, 2013 (JP) .................... 2013-170034

(51) Int. Cl.
*F16H 63/48* (2006.01)
*F16H 63/42* (2006.01)
*F16H 59/66* (2006.01)

(52) U.S. Cl.
CPC ........... *F16H 63/483* (2013.01); *F16H 59/66* (2013.01); *F16H 63/42* (2013.01);
(Continued)

(58) Field of Classification Search
None
See application file for complete search history.

(56) References Cited

U.S. PATENT DOCUMENTS 9,694,791 B2 * 7/2017 Kamo .................. B60T 7/12
2008/0264190 A1 10/2008 Nishimura
(Continued)

FOREIGN PATENT DOCUMENTS

CN 101162045 A 4/2008
JP 2002-295657 A 10/2002

OTHER PUBLICATIONS

Office Action Received for Chinese Patent Application No. 201480045778.2, dated Nov. 1, 2016, 10 Pages of Office Action Including 5 Pages of English Translation.

*Primary Examiner* — Jacob S Scott
(74) *Attorney, Agent, or Firm* — Chip Law Group

(57) ABSTRACT

The SBW-CU that constitutes the shift control device, in the case of selection information for selecting a shift range other than the P range being output by the selection position determination unit when the shift range of the automatic transmission is the P range, maintains the P range without switching the shift range of the automatic transmission in the case of the engine being stopped, and the gradient of the road surface being equal to or greater than a predetermined threshold, and switches the shift range of the automatic transmission based on selection information in the case of the engine not being stopped, or in the case of the road surface gradient being less than the aforementioned predetermined threshold.

16 Claims, 4 Drawing Sheets

(52) U.S. Cl.
 CPC .. *F16H 2059/663* (2013.01); *F16H 2063/423* (2013.01); *F16H 2312/04* (2013.01)

(56) References Cited

U.S. PATENT DOCUMENTS

2012/0136543 A1* 5/2012 Jang .................... F16H 61/0059
 701/53
2013/0305863 A1* 11/2013 Weslati .................. F16H 63/48
 74/411.5

\* cited by examiner

SHIFT CONTROL DEVICE

TECHNICAL FIELD

The present invention relates to a shift control device, and in particular to a shift control device of an automatic transmission having a shift-by-wire mechanism.

BACKGROUND ART

In recent years, there have been put to practical use automatic transmissions equipped with a shift-by-wire (SWB) mechanism that electrically switches the shift range of an automatic transmission by detecting with a switch or the like the shift range that the driver has selected, and driving an actuator of an electric motor or the like based on the detection result. Here, technology (a parking control device) is disclosed in Patent Literature 1 that, in an automatic transmission to which a shift-by-wire mechanism is applied, reduces the large noise and shift shock when releasing the parking state in a situation of a vehicle being parked at an incline.

In this parking control device, in a situation of a vehicle being stopped at an incline, in the case of the release of the parking state being requested by the shift lever being operated, based on the incline direction of the vehicle, the hydraulic pressure control device of the automatic transmission is switched to the forward travel state (D range) or the reverse travel state (R range), and after the forward travel state or reverse travel state is formed, the parking state (parking pole) is released. For that reason, according to this parking control device, prior to releasing the parking state, it is possible to apply torque in the forward travel direction or reverse travel direction so as to oppose the load due to the weight of the vehicle that occurs in the output shaft of the vehicle, and it is possible to smoothly release the parking state.

CITATION LIST

Patent Literature

Patent Literature 1: Japanese Unexamined Patent Application Publication No. 2002-295657

SUMMARY OF INVENTION

Technical Problem

As stated above, according to the parking control device disclosed in Patent Literature 1, when releasing the parking state in a situation of the vehicle being stopped at an incline, it is possible to smoothly release the parking state. However, in the parking control device disclosed in Patent Literature 1, the case of there being a request to release the parking state when the engine is stopped is not considered. For that reason, when a vehicle is stopped on a slope or the like, there is a risk of the parking state being released in the case of there being a request to release the parking state by the key-on state (that is, the state of the ignition key being turned on, and electrical systems such as shift-by-wire being activated, but the engine not having been started).

That is, in the conventional technology given above (shift-by-wire mechanism), when a vehicle is stopped for example on a road surface with a steep gradient, due to the parking range being switched to another shift range in the key-on state in which the engine is stopped, there has been the risk of the vehicle starting to move regardless of the driver's intention.

The present invention was achieved in order to solve the aforementioned problem, and has as its object to provide a shift control device capable of preventing a vehicle from unintentionally starting to move when for example a power unit such as the engine cannot produce drive power, in a shift control device of an automatic transmission that is equipped with a shift-by-wire mechanism.

Solution to Problem

According to the present invention, a shift control device of an automatic transmission that is equipped with a shift-by-wire mechanism and that converts and outputs a drive power of a power unit includes: a selection means that receives an operation to select a shift range of the automatic transmission and outputs a selection information corresponding to the operation; a switching control means that switches the shift range of the automatic transmission in accordance with the selection information output by the selection means; a gradient detection means that detects a gradient of a road surface; and a determination means that determines whether or not the power unit is able to output a drive power. The switching control means, in a case of a selection information for selecting a shift range other than a parking range being output by the selection means when the shift range of the automatic transmission is the parking range, maintains the parking range without switching the shift range of the automatic transmission in a case of the power unit being determined to be in a state of not being able to output a drive power, and the gradient of the road surface being equal to or greater than a predetermined threshold.

According to the shift control device of the present invention, in the case of selection information for selecting a shift range other than the parking range being output, the parking range is maintained without the shift range of the automatic transmission being switched in the case of the power unit not being able to output drive power, and the gradient of the road surface being equal to or greater than a predetermined threshold. That is, for example, when stopped on a steep gradient road surface, even if there is a request to release the parking range in the state of the power unit not being able to produce drive power (for example, in the key-on state in which the engine is stopped), switching of the parking range is prohibited, and the parking range is maintained. For that reason, in an automatic transmission equipped with a shift-by-wire mechanism, when the power unit cannot produce drive power, it becomes possible to prevent the vehicle from unintentionally starting to move.

In the shift control device according to the present invention, it is preferable that the switching control means, in a case of the selection information for selecting a shift range other than the parking range being output by the selection means when the shift range of the automatic transmission is the parking range, switch the shift range of the automatic transmission based on the selection information in a case of the power unit being determined to be in a state of being able to output a drive power, or in a case of a road surface gradient being less than the predetermined threshold.

In this case, the shift range of the automatic transmission is switched in accordance with an operation of the driver when the power unit can output drive power (for example, when the engine is operating), or when the road surface gradient is less than a predetermined threshold (when the gradient is zero or mild). That is, when the vehicle does not move without the intent of the driver, or when it is judged that even if the vehicle starts to move it is in an addressable state, it is possible to switch the shift range in accordance with a request of the driver.

In the shift control device according to the present invention, it is preferable that a warning means that, in a case of the selection information for selecting a shift range other than the parking range being output by the selection means when the shift range of the automatic transmission is the parking range, issues a warning to a driver when the shift range of the automatic transmission is maintained in the parking range without being switched be further included.

Thus, when a maintenance operation differing from an operation (intention) of the driver is performed, because a warning is issued to the driver, it is possible to alert the driver.

In the shift control device according to the present invention, it is preferable that the power unit be an engine, and the determination means determine whether or not the power unit is in a state of being able to output a drive power by determining whether or not the engine is stopped.

Thus, in a vehicle in which an engine is mounted as the power unit, when the engine cannot produce drive power (that is, when the engine is stopped), it becomes possible to prevent the vehicle from unintentionally starting to move.

In the shift control device according to the present invention, it is preferable that the power unit be an engine and an electric motor, and the determination means determine whether or not the power unit is in a state of being able to output a drive power by determining whether or not the engine is stopped and whether or not the electric motor is capable of driving.

Thus, in a hybrid vehicle in which an engine and an electric motor are mounted as the power unit, when both the engine and the electric motor cannot produce drive power, it becomes possible to prevent the vehicle from unintentionally starting to move.

In the shift control device according to the present invention, it is preferable that the power unit be an electric motor, and the determination means determine whether or not the power unit is in a state of being able to output a drive power by determining whether or not the electric motor is capable of driving.

Thus, in an electric automobile in which an electric motor is mounted as the power unit, when the electric motor cannot produce drive power, it becomes possible to prevent the vehicle from unintentionally starting to move.

Advantageous Effects of Invention

According to the present invention, in a shift control device of an automatic transmission equipped with a shift-by-wire mechanism, when for example the power unit such as an engine cannot produce drive power, it becomes possible to prevent the vehicle from unintentionally starting to move.

MODE(S) FOR CARRYING OUT THE INVENTION

Figure 1:
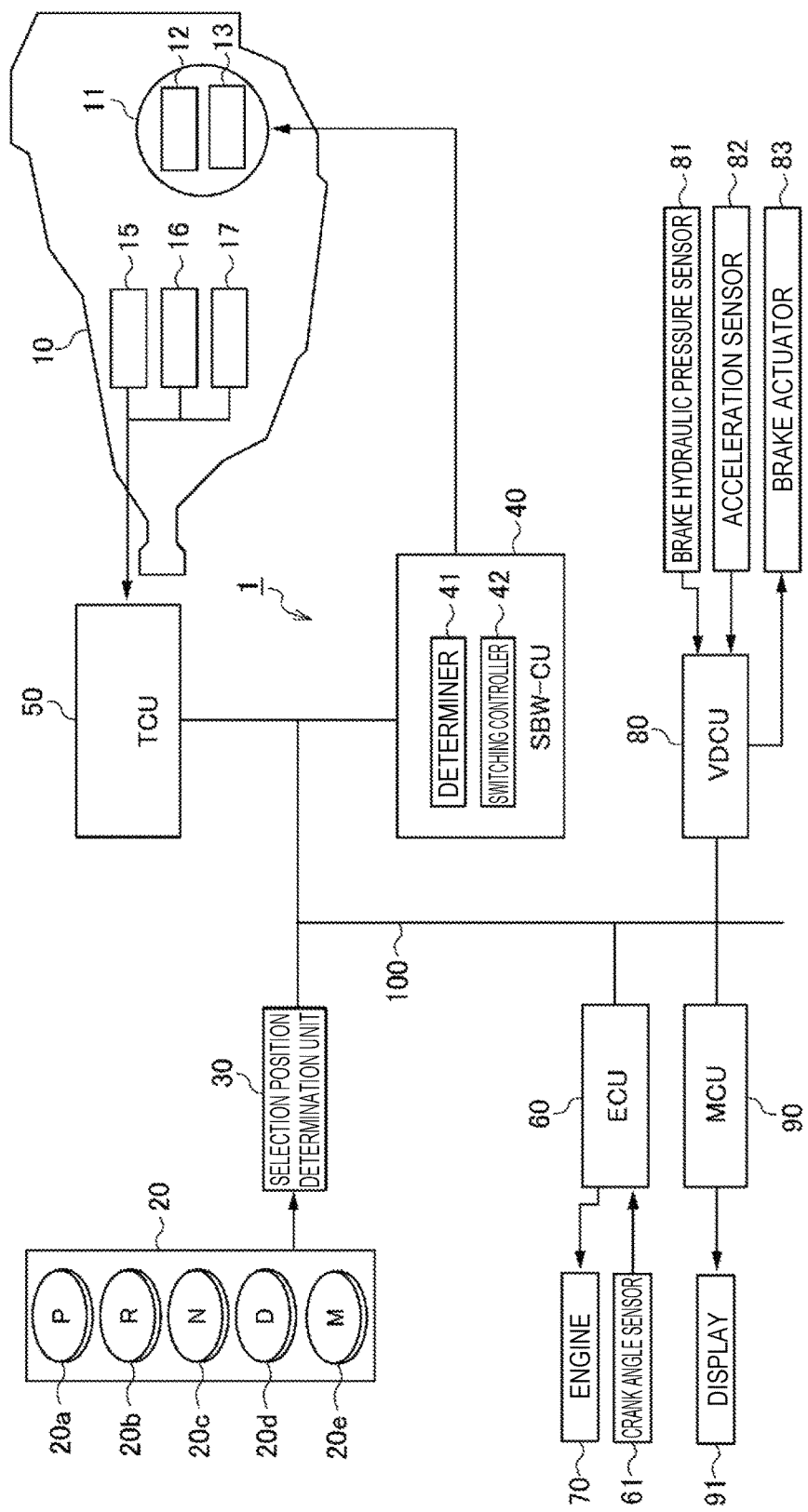
FIG. 1 is a block diagram illustrating the constitution of the shift control device according to the implementation.

Hereinbelow, the preferred implementation of the present invention will be described in detail with reference to the drawings. Note that the same reference numerals shall be used for the same or equivalent portions. Also, in each of the drawings, the same reference numerals are appended to the same elements, with overlapping descriptions thereof being omitted.

First, using FIG. 1, the constitution of the shift control device 1 according to the implementation will be described. FIG. 1 is a block diagram illustrating the constitution of the shift control device 1. Note that here the case of using a gasoline engine (hereinbelow simply called "engine") 70 as the power unit that outputs drive power will be described as an example.

The shift control device 1 chiefly includes a selector 20 that receives operations for selecting the shift range of the automatic transmission 10, a selection position determination unit 30 that generates and outputs selection information in accordance with the selected shift range, and a shift-by-wire control unit 40 that switches the shift range of the automatic transmission 10 based on the selection information, and in the situation of a vehicle in which the shift-by-wire type automatic transmission 10 is mounted being stopped for example on a steep slope, has a function of preventing the vehicle from unintentionally starting to move when the engine 70 is stopped.

The automatic transmission 10 is connected to the output shaft of the engine 70, and converts and outputs the drive power from the engine 70 (note that in FIG. 1, the automatic transmission 10 and the engine 70 are schematically illustrated separated).

A shift-by-wire actuator (hereinbelow called "SBW actuator") 11 that is electrically connected with the shift-by-wire control unit (hereinbelow called "SBW-CU") 40 and that switches the shift range of the automatic transmission 10 in accordance with a control signal (drive signal) from the SBW-CU 40 is attached to the automatic transmission 10. Note that the SBW-CU 40 and the SBW actuator 11 may be integrally formed.

The SBW actuator 11, in accordance with the control signal from the SBW-CU 40, actuates a manual valve of the automatic transmission 10 to switch the shift range of the automatic transmission 10. The SBW 11 includes an electric motor 12 that actuates the manual valve and a position sensor 13 that detects the position of the manual valve, that is, the shift range of the automatic transmission 10. Here, the automatic transmission 10 is constituted to take on five shift ranges, namely, a parking range (parking (P) range), a reverse travel range (reverse (R) range), a neutral range (neutral (N) range), a forward travel range (drive (D) range), and a manual range (manual (M) range).

Figure 2:
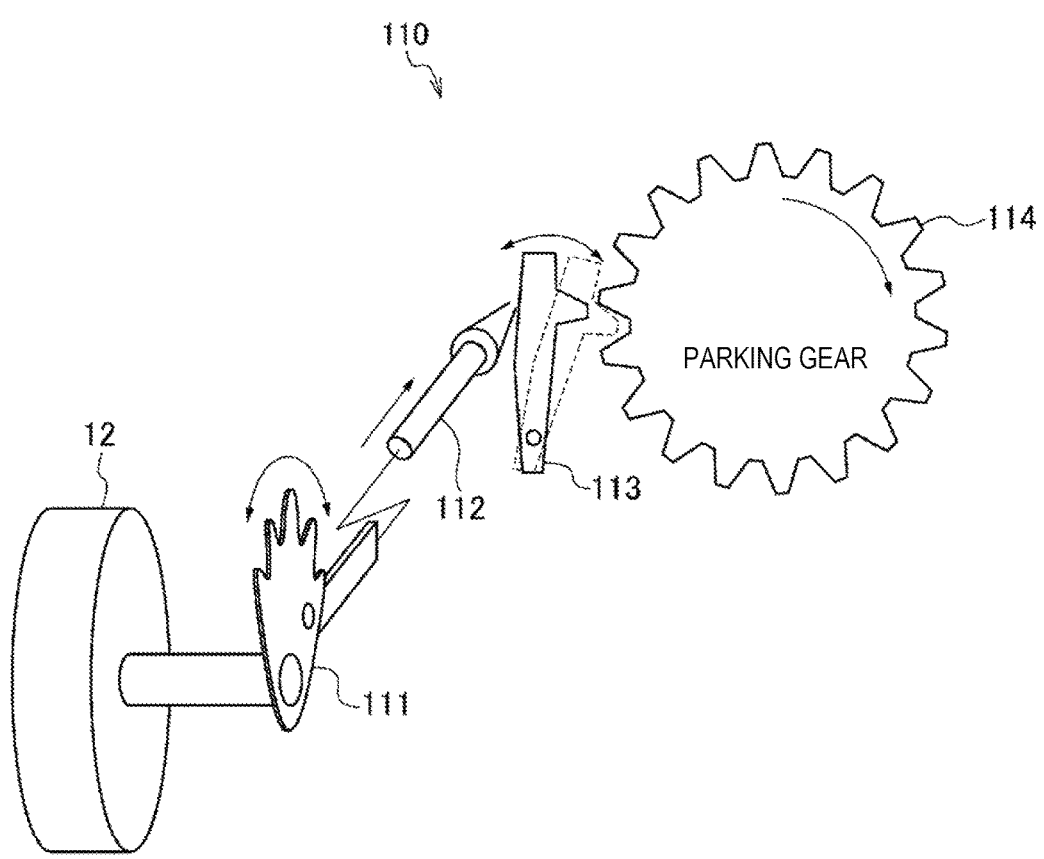
FIG. 2 is a drawing illustrating the constitution of the parking mechanism of an automatic transmission.

Here, referring to FIG. 2, a parking mechanism 110 of the automatic transmission 10 will be described. The parking mechanism 110 is a mechanism that, when a parking switch 20a (hereinafter described in detail) is depressed, locks rotation within the automatic transmission so that the wheels do not rotate. A detent plate 111 is attached to the output shaft of the SBW actuator 11 (electric motor 12) driven by the SBW-CU 40. A parking rod 112 is retractably connected in the axial direction to the detent plate 111. Meanwhile, a parking gear 114 is spline-fitted on the output shaft of the automatic transmission 10. Also, a parking pole 113 is rockably provided so as to be capable of meshing with the parking gear 114.

In the case of the parking switch 20a being depressed, the detent plate 111 rocks by the rotation of the SBW actuator 11 (electric motor 12), whereby the parking rod 112 advances in the axial direction. Then, the parking pole 113 rocks by being pushed from the back side by the parking rod 112 and meshes with the parking gear 114. Thereby, rotation of the automatic transmission 10 is locked.

FIG. 1 is referred to again for description. In for example the center console of the vehicle, there is provided a selector 20 that accepts operations to alternatively select the shift range of the automatic transmission 10 by the driver, and output an electrical signal (selection signal) corresponding to the accepted selection operation. The selector 20 has for example five switches, namely, a parking (P) switch 20a that selects the parking range (P range), a reverse (R) switch 20b that selects the reverse travel range (R range), a neutral (N) switch 20c that selects the neutral range (N range), a drive (D) switch 20d that selects the forward travel range (D range), and a manual (M) switch 20e that selects the manual shift range (M range). For these five switches 20a to 20e, automatic reset switches (momentary switches) are favorably employed that enter the ON state only while being depressed by a finger or the like, and return to the OFF state once the finger is removed.

The selector 20 is electrically connected with the selection position determination unit 30, and outputs an electrical signal (selection signal) corresponding to the depressed switch to the selection position determination unit 30. Note that a lever-type selector mechanism may be used instead of the selector 20.

The selection position determination unit 30 reads in the electrical signal (that is, the switch input) from the selector 20, generates selection information corresponding to the selected shift range, and outputs it. More specifically, the selection position determination unit 30 is connected to the shift-by-wire control unit (hereinbelow called "SBW-CU") 40, and outputs the aforementioned selection information to the SBW-CU 40. That is, the selector 20 and the selection position determination unit 30 function as the selection means recited in the claims.

As stated above, the SBW-CU 40 is electrically connected with the SBW actuator 11. Also, the SBW-CU 40 is via the CAN 100 communicatively connected with the selection position determination unit 30, a transmission control unit (hereinbelow called "TCU") 50, an engine control unit (hereinbelow called "ECU") 60, a vehicle dynamic control unit (hereinbelow called "VDCU") 80, and a meter control unit (hereinbelow called "MCU") 90.

Here, a description of each control unit will be given. First, the TCU 50 governs the transmission control of the automatic transmission 10. An output shaft rotation sensor 16, a range switch (inhibitor switch: a switch that electrically inhibits so that the starter motor does not rotate other than in the P range and the N range) 17 and the like provided in the automatic transmission 10 are connected to the TCU 50. Also, the TCU 50, through the CAN 100, receives information such as the rotation speed of the engine 70 and the accelerator pedal opening transmitted from the ECU 60, and information such as the shift range of the automatic transmission 10 transmitted from the SBW-CU.

Based on various information such as the acquired engine rotation speed, output shaft rotation speed (vehicle speed), accelerator pedal opening, and shift range, the TCU 50 drives a solenoid valve constituting a control valve 15 and performs transmission control of the automatic transmission 10. Here, the control valve 15 controls hydraulic pressure for shifting the automatic transmission 10. More specifically, the control valve 15, by using a spool valve and a solenoid valve that actuates the spool valve to open and close an oil passage, supplies hydraulic pressure generated by an oil pump to for example a drive pulley or driven pulley. Note that the TCU 50 transmits various information of the automatic transmission 10 to the SBW-CU 40 via the CAN 100.

The ECU 60, based on detection signals input from the various sensors, obtains various information such as the engine rotation speed, intake air amount, air-fuel ratio of the gaseous mixture, accelerator pedal opening, and based on the various acquired information, comprehensively controls the engine 70 by controlling the fuel injection and ignition, and various actuators. Here, a crank angle sensor 61 that detects the rotation position of the crankshaft of the engine 70 is connected to the ECU 60, and the engine rotation speed is found by the ECU 60 from the output of the crank angle sensor 61.

A brake hydraulic pressure sensor 81 that detects the master cylinder pressure of the brake actuator 83, and an acceleration sensor 82 that detects front/rear and left/right acceleration are connected to the VDCU 80. Note that the acceleration sensor 82 may also function as a gradient detecting sensor that detects the gradient (angle of inclination) of a road surface. The VDCU 80 drives the brake actuator 83 in accordance with the brake pedal operation amount to brake the vehicle, and detects the vehicle behavior by various sensors (for example a wheel speed sensor, a steering angle sensor, the acceleration sensor 82, a yaw rate sensor and the like), inhibits sideslip and ensures vehicle stability during turns by brake control by automatic pressurization and the torque control of the engine 70. The VDCU 80 transmits braking information (vehicle braking information) and gradient information of the road surface and the like to the SBW-CU 40 via the CAN 100. The VDCU 80 and the acceleration sensor 82 function as the gradient detecting means recited in the claims.

In particular, in the case of selection information for selecting a shift range other than the P range being output from the selection position determination unit 30 when the shift range of the automatic transmission 10 is the P range, the MCU 90 issues a warning and/or information to the driver when the shift range of the automatic transmission 10 is maintained in the P range without being switched. In that event, the MCU 90 drives the display 91 to display the message of for example "Please perform shift operation after starting the engine," or outputs a "beep" warning tone. That is, the MCU 90 and the display 91 function as the warning means recited in the claims.

Based on the selection information received from the selection position determination unit 30, engine rotation speed received from the ECU 60, road surface gradient information received from the VDCU 80, and various input information received from the TCU 50, the SBW-CU 40 generates and outputs a control signal (motor drive signal) and, by driving the SBW actuator 11, switches the shift range of the automatic transmission 10.

For that reason, the SBW-CU 40 is functionally equipped with a determiner 41 and a switching controller 42. The SBW-CU 40 includes a microprocessor that performs operations, ROM that stores programs and the like for causing the microprocessor to execute processes, RAM that stores various data such as operation results, backup RAM in which the stored content is held by a 12V battery, and input/output I/F. By the execution of a program stored in ROM by the microprocessor, the functions of the determiner 41 and the switching controller 41 are realized in the SBW-CU 40.

The determiner 41 determines whether or not the engine 70 is stopped based on the engine rotation speed received from the ECU 60. That is, the determiner 41 functions as the determination means recited in the claims. Here, the determiner 41 determines that the engine 70 is stopped in the case of the engine rotation speed being zero (or less than several tens of rotations), and determines that the engine 70 is being operated when the engine rotation speed is not zero (or when it is equal to or greater than several tens of rotations). Note that the determination result by the determiner 41 is output to the switching controller 42.

The switching controller 42 outputs a control signal (motor drive signal) to the SBW actuator 11 in accordance with the selection information output by the selection position determination unit 30, and switches the shift range of the automatic transmission 10. That is, the switching controller 42 and the SBW actuator 11 function as the switching control means recited in the claims.

In particular, in the case of selection information for selecting a shift range other than the P range being output from the selection position determination unit 30 (that is, a parking state release request being output) when the shift range of the automatic transmission 10 is the P range, the switching controller 42 maintains the P range without switching the shift range of the automatic transmission 10 (prohibits release of the parking state) in the case of the engine 70 being stopped and the gradient of the road surface being equal to or greater than a predetermined threshold (for example, 30 degrees).

Meanwhile, in the case of selection information for selecting a shift range other than the P range being output from the selection position determination unit 30 (that is, a parking state release request being output) when the shift range of the automatic transmission 10 is the P range, the switching controller 42 switches the shift range of the automatic transmission 10 based on the selection information in the case of the engine 70 not being stopped, or in the case of the road surface gradient being less than a predetermined threshold (for example, 30 degrees).

Note that as described above, in the case of selection information for selecting a shift range other than the P range being output from the selection position determination unit 30 when the shift range of the automatic transmission 10 is the P range, when the shift range of the automatic transmission 10 is maintained in the P range without being switched, a warning and/or information is issued to the driver. More specifically, the message "Please perform shift operation after starting the engine" is displayed in the display 91, or a "beep" warning tone is output.

Figure 3:
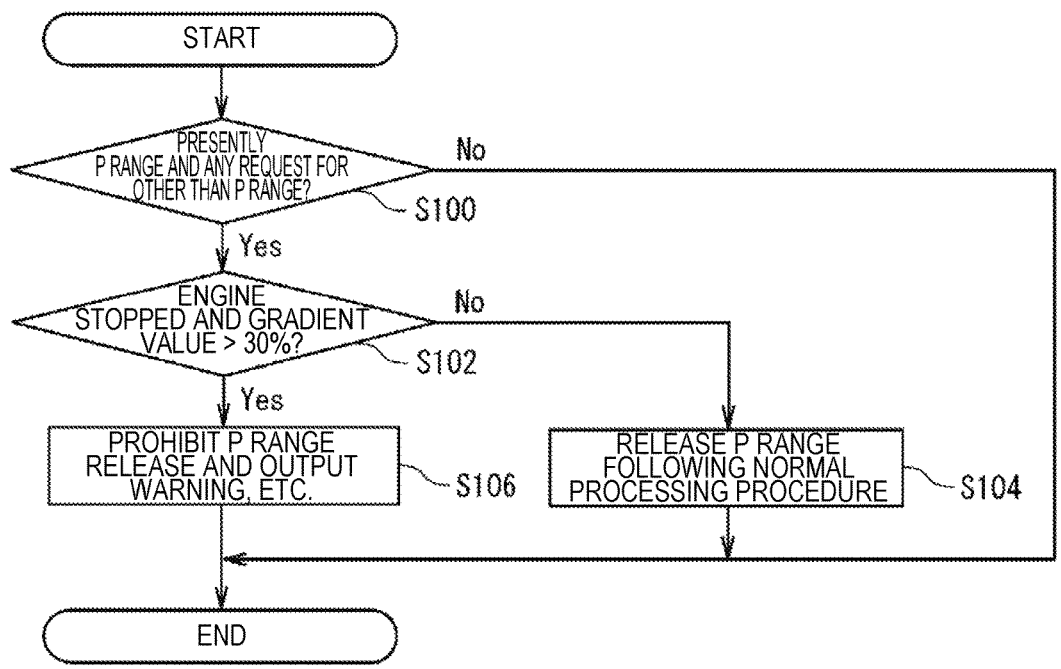
FIG. 3 is a flowchart illustrating the processing procedure of the shift range switching process by the shift control device according to the implementation.

Next, referring to FIG. 3, the operation of the shift control device 1 will be described. FIG. 3 is a flowchart illustrating the processing procedure of the shift range switching process by the shift control device 1. The processing is repeatedly executed at every predetermined time (for example, every 10 ms) in the SBW-CU 40.

In Step S100, a judgment is made as to whether or not the present shift range of the automatic transmission 10 is the P range, and whether or not a request for a shift range other than the P range has been detected by the selection position determination unit 30 (whether or not a range switch 20b to 20e other than the P range switch 20a has been depressed). Here, in the case of the present shift range not being the P range and/or in the case of a switching request to a shift range other than the P range not being detected, this processing is once exited. On the other hand, when the present shift range is the P range and a switching request to a shift range other than the P range has been detected, the processing transitions to Step S102.

In Step S102, a judgment is made as to whether or not the engine rotation speed is zero (rpm) and the value of the road surface gradient is greater than for example 30(%). Here, in the case of the engine rotation speed not being zero (the engine 70 is operating) and/or in the case of the road surface gradient value being 30(%) or less, the processing transitions to Step S104. On the other hand, when the engine rotation speed is zero (the engine 70 is stopped) and the road surface gradient value is greater than 30(%), the processing transitions to Step S106.

In Step S104, according to the normal processing procedure, based on selection information output from the section position determination unit 30, the SBW actuator 11 is driven, and the shift range of the automatic transmission 10 is switched. Thereafter, this processing is once exited.

On the other hand, in Step S106, switching of the shift range to other than the P range (release of the parking state) is prohibited, and the P range is maintained. Also, in Step S106, a warning and/or information is output to the driver. Thereafter, this processing is once exited.

As described above, according to the present implementation, in the case of selection information for selecting a shift range other than the P range being output, in the case of the engine 70 being stopped and the gradient of the road surface being equal to or greater than a predetermined threshold (for example, 30 degrees), the P range is maintained without the shift range of the automatic transmission 10 being switched. That is, for example, when stopped on a steep gradient road surface, even if there is a request to release the P range in the key-on state in which the engine 70 is stopped, switching of the P range is prohibited, and the P range is maintained. For that reason, when the engine 70 cannot produce drive power, it becomes possible to prevent the vehicle from unintentionally starting to move.

Also, according to the present implementation, the shift range of the automatic transmission 10 is switched in accordance with an operation of the driver when the engine 70 is operated, or when the road surface gradient is less than a predetermined threshold (for example, 30 degrees). That is, when the vehicle will not move without the intent of the driver, or when it is judged that even if the vehicle starts to move it is in an addressable state, it is possible to switch the shift range in accordance with a request of the driver.

According to the present implementation, in the case of selection information for selecting a shift range other than the P range being output by the selection position determination unit 30 when the shift range of the automatic transmission 10 is the P range, a warning is issued to the driver when the shift range of the automatic transmission 10 is maintained in the P range without being switched. For that reason, when a maintenance operation that differs with the operation (intention) of the driver is performed, it is possible to alert the driver.

(First Modification)

Figure 4:
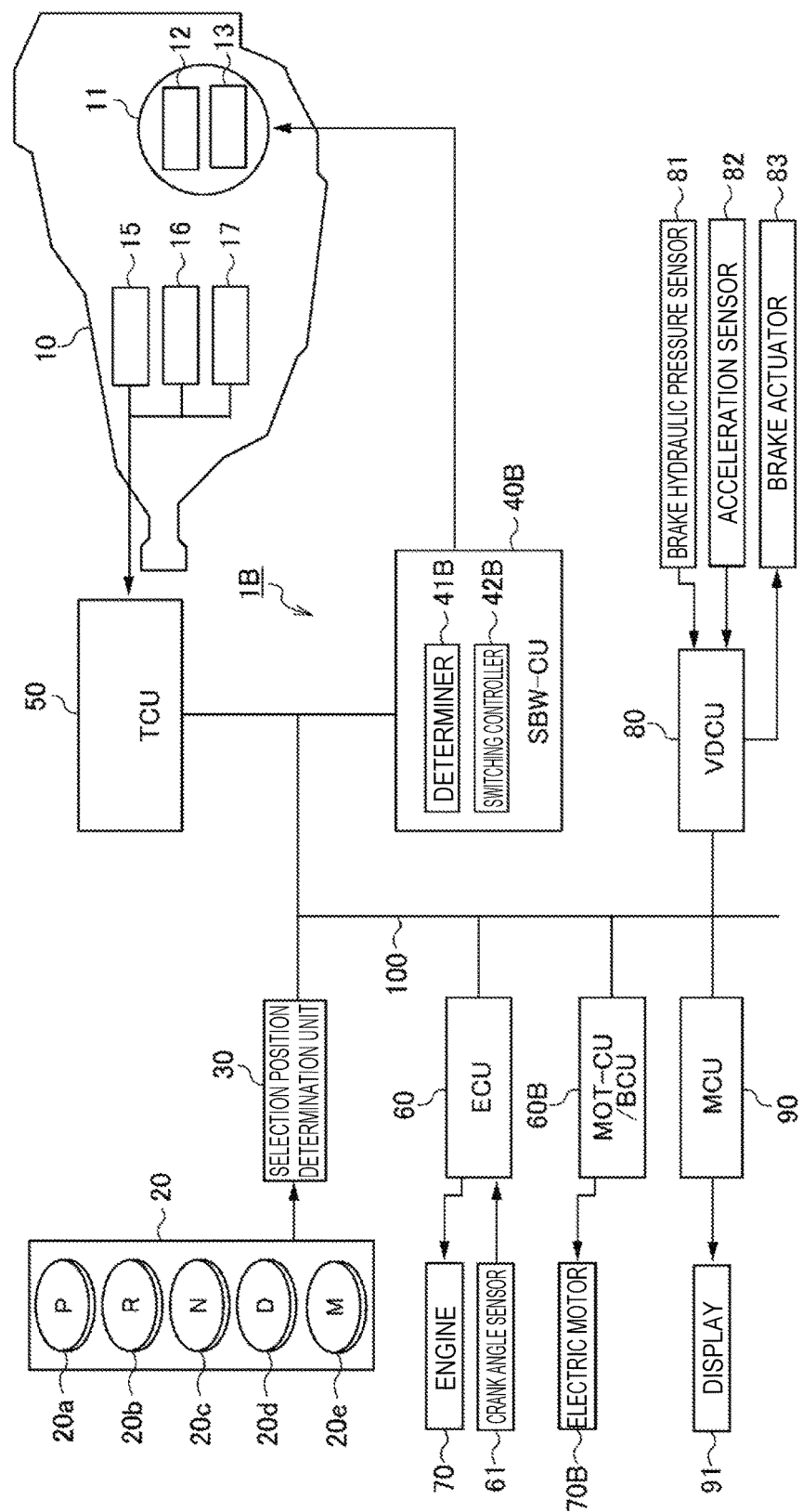
FIG. 4 is a block diagram illustrating the constitution of the shift control device according to a modification.

In the above implementation, a vehicle having the engine 70 be the power unit (drive power source) was described as an example, but the present invention can also be applied to a hybrid vehicle (HV) having an engine and an electric motor be the power unit, and an electric automobile (EV) having an electric motor be the power unit. Therefore, next, a shift control device 1B according to a modification will be described using FIG. 4. FIG. 4 is a block diagram illustrating the constitution of the shift control device 1B. Note that in FIG. 4, the same reference numerals are given to constituent elements that are the same as or equivalent to the above implementation.

The shift control device 1B differs from the aforementioned implementation on the point of the vehicle to which this device is applied having an engine 70 and an electric motor 70B be the power unit. Also, the shift control device 1B differs from the aforementioned implementation on the point of being provided with a determination portion 41B instead of the determination portion 41, and being provided with a switching controller 42B instead of the switching controller 42. Because the other constitutions are the same as or equivalent to the aforementioned implementation, detailed descriptions thereof will be omitted here.

The determination portion 41B determines whether or not the engine 70 is stopped, and for example determines whether or not the electric motor 70B is capable of driving based on for example the SOC (State of Change) of the battery received via the CAN 100 from a motor control unit/battery control unit (MOT-CU/BCU) 60B. More specifically, the determination portion 41B, in the case of for example the SOC dropping whereby it cannot drive the electric motor 70B, determines that the electric motor 70B is incapable of driving. That is, the determination portion 41B functions as the determination means recited in the claims. Note that the determination result of the determination portion 41B is output to the switching controller 42B similarly to the aforementioned implementation.

The switching controller 42B, in the case of selection information for selecting a shift range other than the P range being output from the selection position determination unit 30 when the shift range of the automatic transmission 10 is the P range, maintains the P range without switching the shift range of the automatic transmission 10 (prohibits release of the P range state) when the engine 70 is stopped, the electric motor 70B is incapable of driving, and the gradient of the road surface is equal to or greater than a predetermined threshold (for example, 30 degrees).

Also, the switching controller 42B, in the case of selection information for selecting a shift range other than the P range being output from the selection position determination unit 30 when the shift range of the automatic transmission 10 is the P range, switches the shift range of the automatic transmission 10 based on the selection information in the case of the engine 70 operating, in the case of the electric motor 70B being capable of driving, or in the case of the road surface gradient being less than a predetermined threshold (for example, 30 degrees).

According to the present modification, in the case of selection information for selecting a shift range other than the P range being output, in the case of the engine 70 being stopped, the electric motor 70B being incapable of driving, and the gradient of the road surface being equal to or greater than a predetermined threshold (for example, 30 degrees), the shift range of the automatic transmission 10 is maintained in the P range without being switched. That is, for example, when stopped on a steep gradient road surface, even if there is a request to release the P range in the key-on state, switching of the P range is prohibited, and the P range is maintained. For that reason, when the electric motor cannot produce drive power, it becomes possible to prevent the vehicle from unintentionally starting to move.

Also, according to the present modification, when the engine 70 is operating, when the electric motor 70B is capable of driving, or when the road surface gradient is less than a predetermined threshold (for example, 30 degrees), the shift range of the automatic transmission 10 is switched in accordance with an operation by the driver. That is, when the vehicle will not move without the intent of the driver, or when it is judged that even if the vehicle starts to move it is in an addressable state, it is possible to switch the shift range in accordance with a request of the driver.

(Second Modification)

Also, the present invention can be applied to an electric automobile (EV) having an electric motor be the power unit as described above. In this case, the determination portion 41B determines whether or not the electric motor 70B (power unit) is in a state of being capable of outputting drive power by determining whether or not the electric motor 70B is capable of driving.

The switching controller 42B, in the case of selection information for selecting a shift range other than the P range being output from the selection position determination unit 30 when the shift range of the automatic transmission 10 is the P range, maintains the P range without switching the shift range of the automatic transmission 10 (prohibits release of the P range state) in the case of the electric motor 70B being incapable of driving, and in the case of the gradient of the road surface being equal to or greater than a predetermined threshold (for example, 30 degrees).

Also, the switching controller 42B, in the case of selection information for selecting a shift range other than the P range being output from the selection position determination unit 30 when the shift range of the automatic transmission 10 is the P range, switches the shift range of the automatic transmission 10 based on the selection information in the case of the electric motor 70B being capable of driving, or in the case of the road surface gradient being less than a predetermined threshold (for example, 30 degrees).

Thus, in an electric automobile in which the electric motor 70B is mounted as the power unit, when the electric motor 70B cannot produce drive power, it becomes possible to prevent the vehicle from unintentionally starting to move.

The implementation of the present invention was described above, but the present invention is not limited to the above implementation (or the modification), with various modifications being possible. For example, the system constitution of the aforementioned implementation is one example, and the system constitution of the present invention is not limited to the aforementioned implementation. For example, the SBW-CU 40 and the SBW actuator 11 may be integrated. Also, the SBW-CU 40 and the TCU 50 may be one unit. Also, the SBW-CU 40 and the selection position determination unit 30 may be consolidated into one unit.

Also, the value of the threshold for determining a road surface gradient to be gentle or steep is not limited to 30 degrees, and may be arbitrarily set.

REFERENCE SIGNS LIST 1, 1B shift control device
10 automatic transmission
11 shift-by-wire actuator
20 selector
30 selection position determination unit
40, 40B shift-by-wire control unit
41, 41B determiner
42, 42B switching controller
50 transmission control unit
60 engine control unit
61 crank angle sensor
60B motor control unit/battery control unit
70 engine
70B electric motor 80 vehicle dynamic control unit
81 brake hydraulic pressure sensor
82 acceleration sensor (gradient sensor)
83 brake actuator
90 meter control unit
81 display
100 CAN

The invention claimed is:

1. A shift control device of an automatic transmission that is equipped with a shift-by-wire mechanism and that converts and outputs a drive power of a power unit, the shift control device comprising:
a selection means that receives an operation to select a shift range of the automatic transmission and outputs a selection information corresponding to the operation;
a switching control means that switches the shift range of the automatic transmission in accordance with the selection information output by the selection means;
a gradient detection means that detects a gradient of a road surface; and
a determination means that determines whether or not the power unit is able to output the drive power,
wherein the switching control means, in a case of the selection information for selecting the shift range other than a parking range being output by the selection means when the shift range of the automatic transmission is the parking range, maintains the parking range without switching the shift range of the automatic transmission in a case of the power unit being determined to be in a state of not being able to output the drive power, and the gradient of the road surface being equal to or greater than a predetermined threshold.

2. The shift control device according to claim 1, wherein the switching control means, in a case of the selection information for selecting the shift range other than the parking range being output by the selection means when the shift range of the automatic transmission is the parking range, switches the shift range of the automatic transmission based on the selection information in a case of the power unit being determined to be in a state of being able to output the drive power, or in a case of a road surface gradient being less than the predetermined threshold.

3. The shift control device according to claim 1, further comprising:
a warning means that, in a case of the selection information for selecting the shift range other than the parking range being output by the selection means when the shift range of the automatic transmission is the parking range, issues a warning to a driver when the shift range of the automatic transmission is maintained in the parking range without being switched.

4. The shift control device according to claim 1,
wherein the power unit is an engine, and
the determination means determines whether or not the power unit is in a state of being able to output the drive power by determining whether or not the engine is stopped.

5. The shift control device according to claim 1,
wherein the power unit is an engine and an electric motor, and
the determination means determines whether or not the power unit is in a state of being able to output the drive power by determining whether or not the engine is stopped and whether or not the electric motor is capable of driving.

6. The shift control device according to claim 1,
wherein the power unit is an electric motor, and
the determination means determines whether or not the power unit is in a state of being able to output the drive power by determining whether or not the electric motor is capable of driving.

7. The shift control device according to claim 2, further comprising:
a warning means that, in a case of the selection information for selecting the shift range other than the parking range being output by the selection means when the shift range of the automatic transmission is the parking range, issues a warning to a driver when the shift range of the automatic transmission is maintained in the parking range without being switched.

8. The shift control device according to claim 2,
wherein the power unit is an engine, and
the determination means determines whether or not the power unit is in the state of being able to output the drive power by determining whether or not the engine is stopped.

9. The shift control device according to claim 3,
wherein the power unit is an engine, and
the determination means determines whether or not the power unit is in a state of being able to output the drive power by determining whether or not the engine is stopped.

10. The shift control device according to claim 7,
wherein the power unit is an engine, and
the determination means determines whether or not the power unit is in the state of being able to output the drive power by determining whether or not the engine is stopped.

11. The shift control device according to claim 2,
wherein the power unit is an engine and an electric motor, and
the determination means determines whether or not the power unit is in a state of being able to output the drive power by determining whether or not the engine is stopped and whether or not the electric motor is capable of driving.

12. The shift control device according to claim 3,
wherein the power unit is an engine and an electric motor, and
the determination means determines whether or not the power unit is in a state of being able to output the drive power by determining whether or not the engine is stopped and whether or not the electric motor is capable of driving.

13. The shift control device according to claim 7,
wherein the power unit is an engine and an electric motor, and
the determination means determines whether or not the power unit is in the state of being able to output the drive power by determining whether or not the engine is stopped and whether or not the electric motor is capable of driving.

14. The shift control device according to claim 2,
wherein the power unit is an electric motor, and
the determination means determines whether or not the power unit is in a state of being able to output the drive power by determining whether or not the electric motor is capable of driving.

15. The shift control device according to claim 3,
wherein the power unit is an electric motor, and
the determination means determines whether or not the power unit is in a state of being able to output the drive power by determining whether or not the electric motor is capable of driving.

16. The shift control device according to claim 7,
wherein the power unit is an electric motor, and
the determination means determines whether or not the power unit is in the state of being able to output the drive power by determining whether or not the electric motor is capable of driving.

\* \* \* \* \*